United States Patent
Fulconis et al.

(10) Patent No.: US 6,716,402 B2
(45) Date of Patent: Apr. 6, 2004

(54) DISSOLUTION AND DECONTAMINATION PROCESS

(75) Inventors: Jean-Michel Fulconis, Roquemaure (FR); Jacques Delagrange, St Paulet de Caisson (FR); Francis Dalard, Meylan (FR)

(73) Assignee: Commissariat a l'Energie Atomique, Paris (FR)

( * ) Notice: Subject to any disclaimer, the term of this patent is extended or adjusted under 35 U.S.C. 154(b) by 236 days.

(21) Appl. No.: 10/050,915

(22) Filed: Jan. 22, 2002

(65) Prior Publication Data

US 2002/0150196 A1 Oct. 17, 2002

(30) Foreign Application Priority Data

Feb. 8, 2001 (FR) .............................. 01 01704

(51) Int. Cl.$^7$ .............................. C01G 55/00
(52) U.S. Cl. .............. 423/22; 376/308; 976/DIG. 375; 976/DIG. 391; 976/DIG. 392
(58) Field of Search .......................... 423/22; 376/308; 976/DIG. 375, DIG. 391, DIG. 392

(56) References Cited

U.S. PATENT DOCUMENTS 2,967,209 A * 1/1961 Grummitt et al.
3,853,980 A * 12/1974 Berton et al.
5,248,496 A    9/1993 Schuster et al.

FOREIGN PATENT DOCUMENTS

| EP | 424776 | * 5/1991 |
|---|---|---|
| EP | 0247933 | 12/1997 |
| JP | 63-242934 | * 10/1988 |
| JP | 63-243232 | * 10/1988 |
| JP | 10272327 | 10/1998 |

OTHER PUBLICATIONS

Database WPI, Section Ch, Week 198846, Derwent Publications Ltd., London, GB; Class K07, AN 1988–327938, XP002181487, no month.

* cited by examiner

*Primary Examiner*—Steven Bos
(74) *Attorney, Agent, or Firm*—Swiss Law Group

(57) ABSTRACT

The present invention concerns a process for dissolving ruthenium deposits that are present on a surface and a process for decontaminating the internal circuits of nuclear fuel reprocessing plants using the said dissolution process.

The process according to the invention comprises bringing the said surface into contact with an aqueous solution of perruthenate, with the said aqueous solution having a pH equal to or greater than 12, so that the ruthenium is oxidised.

16 Claims, 2 Drawing Sheets

DISSOLUTION AND DECONTAMINATION PROCESS

This application claims priority under 35 U.S.C. §§119 and/or 365 to 01 0174 filed in France on Feb. 8, 2001; the entire content of which is hereby incorporated by reference.

TECHNICAL FIELD

The present invention concerns a process for dissolving ruthenium deposits that are present on a surface and a process for decontaminating the internal circuits of nuclear fuel reprocessing plants using the said dissolution process.

The present invention therefore concerns, in particular, the decontamination of internal circuits in irradiated nuclear fuel reprocessing plants. The process according to the present invention makes it possible to remove deposits composed, in part, of ruthenium from the pipes and other equipment in such plants.

Radioactive ruthenium, in other words the isotopes $^{106}$Ru and $^{103}$Ru, or stable ruthenium, make up part of the fission products in nuclear fuels after irradiation in a reactor. In a general manner, in fuel irradiated at 34,000 megawatts/day, the level of ruthenium is around 0.2% of the initial weight of uranium.

During the various reprocessing stages for irradiated fuels, most of this ruthenium is found in the circuits and equipment of the reprocessing plants in various chemical forms. Some species are soluble in the medium generally used to attack the fuel, in other words nitric acid. These species are, for example, complexes of nitrated nitro nitrosyl ruthenium RuNO $(NO_3)_3$ $(H_2O)_2$.

Other species are particularly insoluble in this medium, such as the oxides of ruthenium $RuO_2$ and $RuO_2 \cdot x (H_2O)_{2<x<3}$ or even metallic ruthenium. The fraction of insoluble ruthenium generally represents between 25 and 90%, depending on the type of nuclear fuel.

Depending on their origin and chemical nature, these insoluble species are found in various places in the reprocessing plant such as in the dissolution circuits at the head of the process, at the point of the first extraction cycle or the concentration and storage circuits for the fission products.

In terms of cleaning up reprocessing plants, the treatment of ruthenium is important for two main reasons:

due to its specific activity, deposited active ruthenium accounts for a significant part of the residual activity and removing this ruthenium constitutes a favoured method of reducing the radioactive dose rate of installations before they are dismantled.

when the ruthenium precipitates, it entraps radioactive elements such as U or Pu, for example. These irradiating deposits cover the metal walls and, as a result, limit the efficiency of the sequences used for cleaning the metal walls, which represent the ultimate phases of clean up.

The elimination of these various types of ruthenium deposit is therefore a vital step in the clean up of irradiated fuel reprocessing plants.

STATE OF THE PRIOR ART

Patent application EP-A-O 247 933 describes a decontamination process for solid materials that have been contaminated with radioactive elements such as ruthenium. In this process, the part that needs decontaminated is firstly brought into contact with a decontaminating solution of sodium hydroxide at a concentration of 8 mol.l$^{-1}$, and $K_2S_2O_8$ at a concentration of 25 g.l$^{-1}$, then rinsed with a sulphuric acid solution, at a concentration of 0.5 mol.l$^{-1}$.

This method is efficient but has two major disadvantages:

it uses a very strong sodium hydroxide solution, containing around 184 g.l$^{-1}$ of sodium, which leads to a high number of glass vessels being required to treat the effluent that is generated, and it uses sulphates, which is a disadvantage in operational terms and can cause problems of corrosion in acid media in certain grades of steel such as austenitic steel.

Other oxidisers in alkaline media have been considered, such as Mn$^{VII}$ in the form of KMnO$_4$, but the precipitation phenomena of reduced Mn$^{II}$ leads to part of the Ru being entrapped in the radioactive sludge, which is difficult to treat.

Oxidation processes in acidic media have the disadvantage of leading to high volatilisation of the ruthenium in the form of ruthenium tetra-oxide RuO$_4$, which leads to aerial contamination of installations by reductive polymerisation in the form of $(RuO_2)x \cdot (RuO_4)y \cdot zH_2O$. This phenomenon is also encountered in the treatment of effluents containing ruthenium by evaporation in nitric media or the dissolution of used fuels. Moreover, oxidising processes in acidic media have the disadvantage of being more sensitive in terms of the corrosion resistance of installations made out of austenitic steel with a quite narrow passivation range.

Document JP-A-63 243 232 describes a process for decontaminating parts that have been contaminated with Ru by bringing them into contact with a flow of ozone gas, forming volatile RuO$_4$, trapping the RuO$_4$ on a specific absorbent, and reducing the ruthenium into the form of Ru metal. The use of ozone as the oxidising agent allows the ruthenium to be maintained in a volatile form, in other words, there are no polymerisation phenomena on the aerial metal parts up to the recovery reactor.

This process cannot be used for cleaning up reprocessing plants for several reasons:

the decontamination is carried out at high temperature. However, it is not possible to heat, without high cost, all of the circuits that need to be decontaminated.

this process means that a trapping reactor has to be created, which constitutes an awkward modification to the installation.

this process means that a Ru recovery unit has to be created for every part involved in the clean up operation.

The oxidation of ruthenium by ozone in liquid phase is, moreover, used for the purification and the recovery of ruthenium from catalysts and electrodes.

Document U.S. Pat. No. 5,248,496 describes a method for volatilising ruthenium in the form of RuO$_4$ through the successive formation of ruthenate, perruthenate then tetra-oxide at a pH close to 8 and a temperature between 80 and 100° C.

Document JP-A-10 273 327 describes a method for synthesising RuO$_4$ by the reaction of rutheniated species, Ru metal, tri-halide, sulphate, oxide or in the form of soluble complexes, with ozone in water with a pH less than or equal to 7 and at a temperature of, ideally, between 5 and 50° C.

In both processes, going through a gaseous form allows the ruthenium to be purified so that it can be re-used. Maximum volatilisation conditions are therefore an objective.

This is not an objective in the case of cleaning up reprocessing plants. In fact, in these plants, it is necessary to solubilise the ruthenium in a decontaminating solution before sending the said solution to the outlets for vitrification.

The precise objective of the present invention is to provide a process that meets this objective and which does not have the disadvantages mentioned above.

DESCRIPTION OF THE INVENTION

In order to attain this objective, the present invention provides a process for dissolving ruthenium deposits that are present on a surface, comprising bringing the said surface into contact with an aqueous solution of perruthenate, with the said aqueous solution having a pH equal to or greater than 12.

The ruthenium deposits are, for example, of ruthenium metal or oxides of ruthenium such as the oxides of ruthenium $RuO_2$ and $RuO_2 \cdot x (H_2O)_{2<x<3}$.

The reaction involved can be expressed schematically as follows:

$$Ru_{solid} + RuO_4^-{}_{aqueous} \rightarrow 2\ RuO_4^{2-}{}_{aqueous}$$

with $Ru_{solid}$ being the ruthenium making up the deposit that has to be dissolved, $RuO_4^-{}_{aqueous}$ the perruthenate of the basic aqueous solution used to dissolve the deposits of ruthenium according to the present invention, and $RuO_4^{2-}{}_{aqueous}$ the ruthenium that has been dissolved in the aqueous solution in its ruthenate form.

The perruthenate is the oxidant of the perruthenate/ruthenate couple:

$$RuO_4^{2-}/RuO_4^{2-} E^0=0.593 V/ENH\ at\ pH=14$$

In the process according to the present invention, this redox couple presents the following advantages:

- it has quite a high oxidation potential for oxidising the ruthenium deposits targeted in the process according to the present invention.
- it is soluble in its oxidised form and in its reduced form, and this avoids precipitation phenomena such as those encountered in the prior art with the $MnO_4^-/MnO_2$ couple.

According to a particular embodiment of the present invention, the perruthenate can be regenerated in situ by injection of a gaseous regeneration agent into the aqueous solution that is in contact with the said surface.

The gaseous regeneration agent may be, for example, ozone, a mixture of air and ozone, nitrogen and ozone or oxygen and ozone.

The ozone may be produced from a release generator in which either industrial air or nitrogen and pure oxygen are circulated.

The chemical reaction for the regeneration of the perruthenates from the ruthenates by ozone may be expressed schematically as follows:

$$2\ RuO_4^{2-}{}_{aqueous} + O_3 + H_2O \rightarrow 2\ RuO_4^-{}_{aqueous} + O_2 + 2\ OH^-$$

In the process according to the present invention, the ozone, when it is present, fulfils the double role of acting as an agent for regenerating the perruthenates and for direct oxidation of the deposit.

In fact, due to its high redox potential in basic media, 1.246 V/ENH at 25° C. and pH=14, it oxidises most inorganic species. Thus, in solution, it oxidises the rutheniated species that form the deposits of ruthenium directly, according to the reaction:

$$Ru_{solid} + 7/3\ O_3 + H_2O \rightarrow RuO_4^{2-}{}_{aqueous} + O_2 + 2\ OH^-$$

The process according to the present invention therefore allows continuous regeneration of the perruthenates from the ruthenates formed by the dissolution of the ruthenium deposits, and, if appropriate, putting part of the ozone, which can act directly on the ruthenium deposits, into solution.

The regeneration agent may be injected into the solution for dissolving the ruthenium deposits at any existing injection point in the installation for reprocessing irradiated fuel, such as a transfer and/or mixing air-lift, a bubbling rod or feed ramp, etc. Ideally, according to the invention, this agent, for example ozone, should be solubilised as completely as possible in the aqueous phase.

The injection of the gaseous regeneration agent, according to the process of the present invention, advantageously allows continuous renewal of the solid/liquid interface between the basic solution used for dissolving the ruthenium deposits and the surface that needs to be treated, thus favouring the dissolution reactions of the insoluble species, in other words, the deposits.

According to the invention, contact is preferably maintained for sufficient time to dissolve all of the ruthenium deposits. The time this takes depends particularly on the concentration of perruthenate in the basic aqueous solution used, and the quantity of ruthenium deposits that need to be dissolved. Those skilled in the art will know how to adapt this time as a function of these parameters and the industrial constraints, such as the time allowed for this type of operation.

According to one implementation of the present invention, in order to bring the surface with the deposit of ruthenium that needs to be dissolved into contact with the aqueous solution, the aqueous solution can advantageously be circulated in order to facilitate the exchange between the solution and the deposits that need to be dissolved. For example, when the surface is the internal surface of a pipe, the solution may be circulated within the interior of the pipe.

When the reactions of ozone with the ruthenate or the contaminants produce oxygen, the oxygen can be evacuated directly via existing vent pipe circuits, for example in installations for reprocessing nuclear fuels.

According to the invention, the aqueous solution is a basic aqueous solution containing a salt of ruthenium with a valency of VII, the perruthenate $RuO_4^-$. According to the invention, this aqueous solution can have a concentration C in mol.l$^{-1}$ of perruthenate, where $0<C\leq 0.1$, for example around $10^{-4}$ mol.l$^{-1}$.

The $pH\geq 12$ makes it possible to obtain ruthenates and perruthenates, and to avoid or limit the formation of ruthenium tetra-oxide, due to the reduction reaction of the tetra-oxide by the hydroxide ions present in the solution, according to the following reaction:

$$2\ RuO_4 + 2 OH^- \rightarrow 2\ RuO_4^- + H_2O + \tfrac{1}{2} O_2$$

In addition, in the case where ozone is used to regenerate the perruthenate, the concentration in $OH^-$ must not be too high, so that the consumption of ozone by $OH^-$, a reaction that transforms the dissolved molecular ozone into inefficient radical species, is limited.

Thus, according to the invention, the basic aqueous solution has, preferably, a concentration of $OH^-$ ions from 0.01 to 6 mol.l$^{-1}$, and preferably from 0.03 to 0.6 mol.l$^{-1}$, for example 0.5 mol.l$^{-1}$.

The aqueous solution may be made basic with, for example, sodium hydroxide.

According to the invention, the contact stage may be carried out at a temperature from 5 to 50° C., for example at ambient temperature, and for example at a temperature from 15 to 30° C. Higher temperatures reduce the solubility of ozone and increase the rate of consumption of molecular ozone through reaction with the $OH^-$.

According to the particular embodiment of the process of the present invention, when the ozone is injected into the aqueous dissolution solution, it can cause the volatilisation of part of the ruthenium. This is not a drawback in the process according to the present invention because the excess ozone, which can represent around 50% of the injected ozone, maintains the $RuO_4$ produced in gaseous form.

According to the present invention, gases such as the excess ozone and the $RuO_4$ emanating from the aqueous solution during the dissolution process, can be recovered by scrubbing with a scrubbing solution for these gases.

According to the invention, the gas scrubbing solution can be an aqueous solution comprising from 0.01 to 10 mol.l⁻ of OH ions, for example from 0.5 to 2 $mol.l^{-1}$, for example a sodium hydroxide solution. The concentration of sodium hydroxide can be, for example, around 1 $mol.l^{-1}$. The sodium hydroxide plays the double role of destroying the excess ozone through the formation of radical species, which instantly decompose into oxygen, and recovering the ruthenium in the form of a soluble ruthenate/perruthenate mixture.

The scrubbing of the gases may be carried out at a temperature from 0 to 100° C., and preferably at ambient temperature, for example at a temperature of from 15 to 30° C.

In short, the process according to the present invention consists in decontamination by oxidative dissolution of different ruthéniated species present on a surface, for example in the circuits and equipment in a reprocessing plant for irradiated nuclear fuels.

The present invention therefore also concerns a process for decontaminating reprocessing plants for irradiated nuclear fuels, that implements the dissolution process according to the present invention.

Apart from the advantages mentioned above, the cost of treating the dissolution effluent from the process according to the present invention is low, due to the fact of that the oxidising agent can be regenerated.

Moreover, the risks of corrosion of austenitic steels in certain installations by ozone in basic media are much reduced. In fact, the range of passivation of austenitic steels in basic media is very wide, from between 0.200 and 1,400 V/ENH, which limits the risks of corrosion when it is necessary to have a potential of around 0.6 V/ENH in order to obtain the ruthenates and perruthenates in basic media.

Other advantages will become clear on reading the following description, the examples given by way of illustration and which are in no way restrictive, and by referring to the figures in the Appendix.

DETAILED DESCRIPTION OF THE EMBODIMENTS

Example 1

Rate of dissolution of a deposit of ruthenium as a function of the perruthenate concentration in an aqueous solution of perruthenate according to the process of the present invention.

Table 1 below illustrates how the rate of dissolution of a deposit of ruthenium is influenced by the concentration of ruthenates, by showing the time required for dissolution of a deposit of 0.2 g of hydrated ruthenium dioxide by a gaseous ozone flow of 4.2 $g.h^{-1}$ in 0.5 molar sodium hydroxide. The volume of the reactor was 3 liters. Each of the reactions was carried out under similar hydrodynamic conditions at 20° C.

Figure 1:
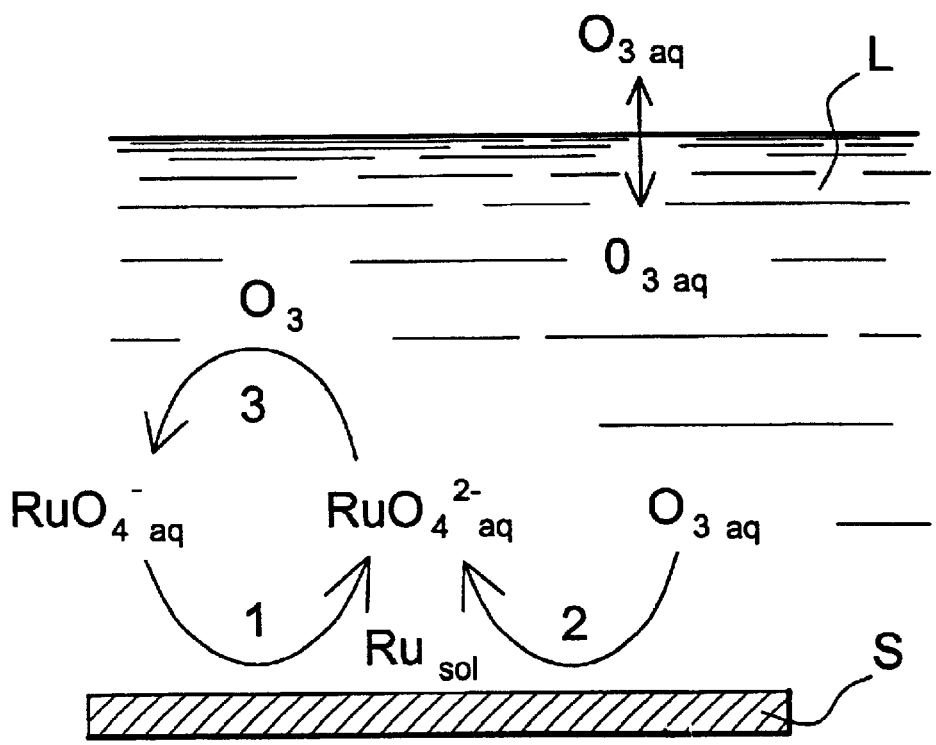
FIG. 1 is a schematic representation of the different chemical reactions that take place in the process according to the present invention.

The chemical reactions that take place are shown schematically in FIG. 1. In this figure, S=surface covered by the ruthenium deposit and L=basic aqueous solution.

TABLE 1

Change in the rate of dissolution as a function of the initial concentration of ruthenate

| Ruthenate concentration (in $mol.l^{-1}$) | Reaction time (minutes) |
| --- | --- |
| 0 | 12 |
| $10^{-4}$ | 6 |
| $10^{-3}$ | 2 |

During the dissolution reaction of the ruthenium deposits, the oxidised ruthenium becomes soluble in the form of ruthenate then perruthenate, and the reaction is therefore self-catalysing.

Example 2

Process according to the present invention with and without a gaseous regeneration agent.

Table 2 shows the oxidising potential of an aqueous sodium hydroxide solution, with or without oxygen or ozonised oxygen gas mixing.

TABLE 2

Oxidising potential of sodium hydroxide solutions in the presence of ozone

| Medium | Potential (mV/ENH) |
| --- | --- |
| Sodium hydroxide 1 $mol.l^{-1}$ | 60 |
| Sodium hydroxide 1 $mol.l^{-1}$ + $O_2$ | 110 |
| Sodium hydroxide 1 $mol.l^{-1}$ + $O_2/O_3$ | 220 |

Table 2 shows that introducing ozone into the solution considerably increases the oxidising power of the solution and allows the oxidising reactions of the different rutheniated species that have to be solubilised to take place.

Table 3 shows the change in the oxidising potential of a sodium hydroxide solution in the presence of ozone as a function of the ozone concentration.

TABLE 3

Change in the potential as a function of the sodium hydroxide concentration

| Sodium hydroxide concentration ($mol.l^{-1}$) | Potential (mv/ENH) |
| --- | --- |
| 1 | 220 |
| 0.5 | 300 |
| 0.1 | 500 |

The oxidising power of the solution thus increases when the sodium hydroxide concentration is decreased.

Table 4 shows the effect of lowering the sodium hydroxide concentration over the time required for the dissolution of 0.2 g of hydrated ruthenium dioxide with a flow of gaseous ozone of 4.2 g.h$^{-1}$ at ambient temperature (T=20° C.) under similar hydrodynamic conditions.

TABLE 4

Change in the reaction rate as a function of the sodium hydroxide concentration.

| Sodium hydroxide concentration (mol.l$^{-1}$) | Reaction time (minutes) |
|---|---|
| 1 | 20 |
| 0.5 | 11 |
| 0.25 | 13 |

The reduction in the sodium hydroxide concentration thus reduces the rate of hydrated ruthenium dissolution up to a levelling off point, at a concentration of around 0.5 mole per liter of solution.

Example 3

Effect of temperature on the process according to the present invention.

Table 5 shows the reduction in the molecular ozone concentration in solution as a function of the temperature in a solution of NaOH=1 mol.l$^{-1}$.

TABLE 5

Change in the oxidation potential as a function of the temperature.

| Temperature (° C.) | Potential (mV) |
|---|---|
| 25 | 300 |
| 40 | 200 |

Table 6 illustrates how the reaction rate is independent of the temperature between 20 and 40° C., by showing the time required for the dissolution of a deposit of 0.2 g of hydrated ruthenium dioxide with a flow rate of gaseous ozone of 4.2 g.h$^{-1}$ in 0.5 molar sodium hydroxide and under similar hydrodynamic conditions.

TABLE 6

Change in the rate of decontamination as a function of the temperature.

| Temperature (° C.) | Reaction time (minutes) |
|---|---|
| 20 | 11 |
| 40 | 12 |

Example 4

Device for implementing the process according to the present invention.

Figure 2:
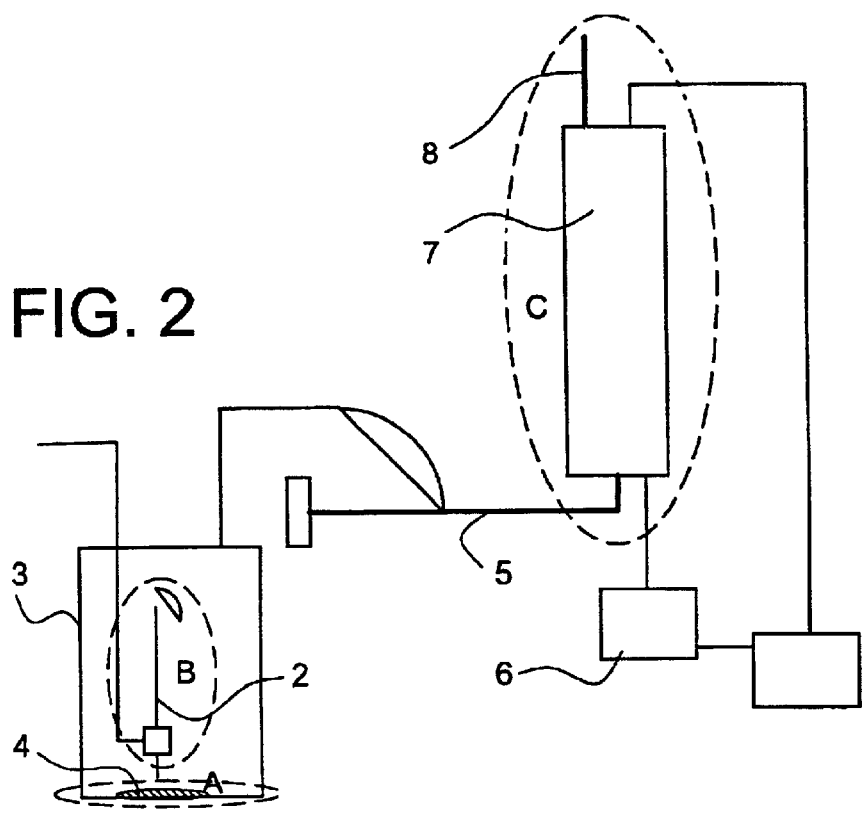
FIG. 2 is a schematic representation of a device for implementing the process according to the present invention.

The device used in the process according to the present invention as described above, with the presence of air-lifts in the vessels that need to be decontaminated and a column for scrubbing the gases equipping the vent hole circuits in the irradiated nuclear fuel reprocessing plants, is shown schematically in FIG. 2 in the Appendix.

It comprises a vessel 3, equipped with a system for injecting the gas 2, for example an air-lift. The vessel is contaminated with a deposit 4, containing ruthenium.

The vessel is filled up with an aqueous solution rendered basic by sodium hydroxide at a concentration of 0.3 mol.l$^{-1}$, to which has been added sodium ruthenate at a concentration of 100 mg/l$^{-1}$.

The vessel is agitated by an air-lift that feeds the gas circuit 1 of the air-lift 2 with a gaseous mixture containing ozone, and at least one gas chosen from nitrogen and oxygen.

The reaction zones involved in the decontamination are:

zone A, in which the deposit covers the vessel, and in which the oxidation mainly takes place by the perruthenates formed in the air-lift 2.

zone B, in the air lift 2, where direct oxidation by ozone of the solid particles swept along by mixing and the oxidation of ruthenates into perruthenates takes place.

In parallel, a volatilised fraction of ruthenium is swept towards the gas treatment circuit 5, equipped with a gas/liquid contactor 7, made up of a gas scrubbing column, in which there is a basic scrubbing solution 6 of sodium hydroxide, at a concentration of 1 mol.l$^{-1}$, and is brought into contact with the gaseous phase before it leaves towards the vent circuit 8. The reaction zone involved in this stage is the zone C, corresponding to the gas scrubbing column in which the destruction of excess ozone and the solubilisation of $RuCO_4$ by reduction by the sodium hydroxide in the form of perruthenates takes place.

Example 5

Process according to the invention with an aqueous solution of perruthenates and sodium hydroxide, without a regeneration agent.

Figure 3:
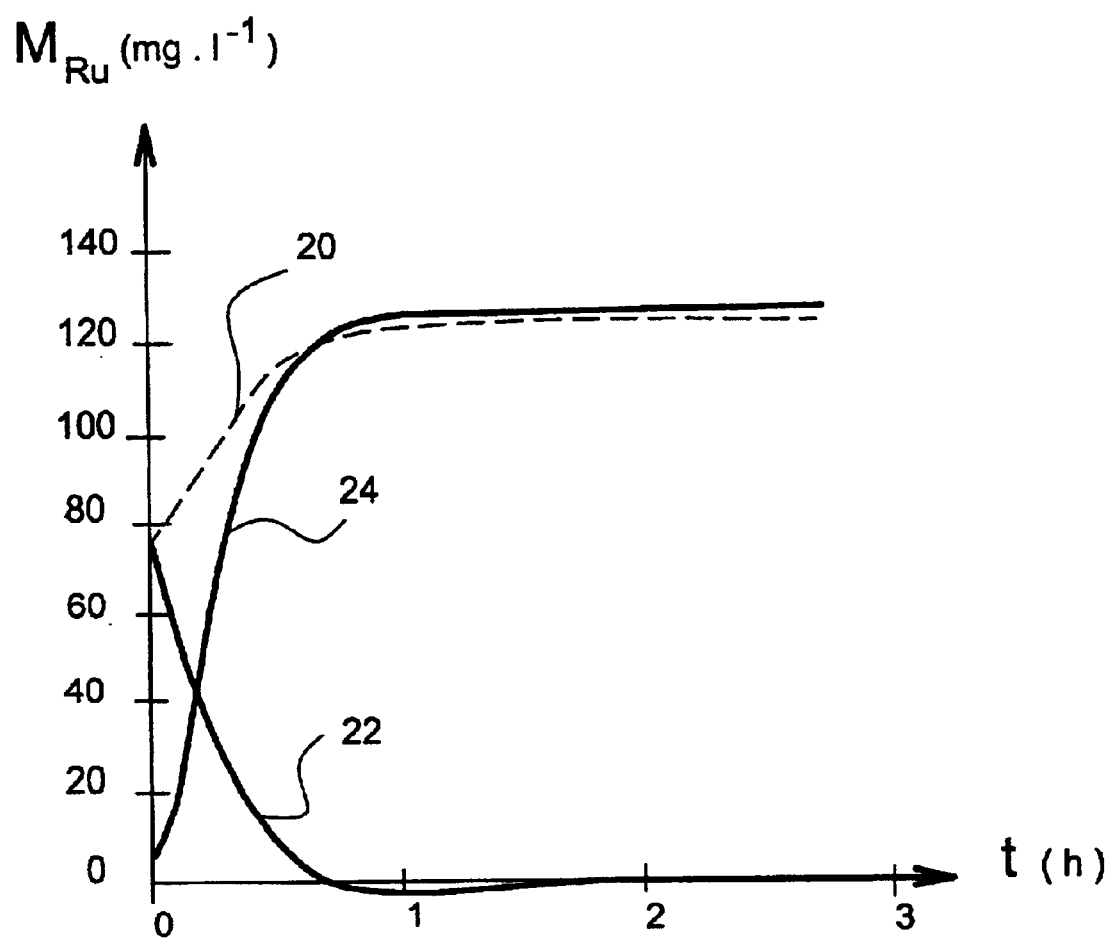
FIG. 3 is a graphic representation of the change in the concentration in ruthéniated species as a function of the time in a solution of perruthenate according to the process of the present invention.

FIG. 3 shows the change in the composition of the decontamination solution during the dissolution of 50 mg of insoluble ruthenium in the form of hydrated ruthenium dioxide by bringing it into contact with an aqueous sodium hydroxide solution at a concentration of 0.1 mol.l$^{-1}$ containing perruthenates in solution at a concentration of 75 mg/l of Ru in the form of perruthenates at 25° C. without the perruthenate regeneration agent.

During this experiment, the 1 liter volume of decontamination solution was continuously agitated.

In this figure, reference 20 indicates the change in the concentration of total Ru in the decontamination solution (mg. l$^{-1}$), reference 22 indicates the change in the concentration of perruthenate in the decontamination solution (mg. l$^{-1}$), and reference 24 indicates the change in the concentration of ruthenate in the decontamination solution (mg. l$^{-1}$), all as a function of temperature (in hours).

This figure shows that during the reaction, the concentration in perruthenate drops due to the fact that there is no regeneration agent present and, at the same time, the concentration of ruthenate increases in the same way as the concentration of ruthenium in solution. These curves also show the fact that the reaction for dissolving the ruthenium deposit by the perruthenate is very rapid and after two hours, almost all of the deposit has been solubilised.

What is claimed is:

1. Process for dissolving ruthenium deposits that are present on a surface, comprising bringing said surface into contact with an aqueous solution of perruthenate, having a pH equal to or greater than 12.

2. Process according to claim 1, in which said aqueous solution has a concentration C in mol.l$^{-1}$ of perruthenate, wherein $0 < C \leqq 0.1$.

3. Process according to claim 2, in which said aqueous solution has a concentration C of $10^{-4}$ mol.l$^{-1}$.

4. Process according to claim 1, in which said aqueous solution has a concentration of OH ions of between 0.01 and 6 mol.l$^{-1}$.

5. Process according to claim 1, in which said aqueous solution has a concentration of OH ions of between 0.03 and 0.6 mol.l$^{-1}$.

6. Process according to claim 1, in which contact is made at a temperature of between 5 and 50° C.

7. Process according to claim 1, in which the perruthenate is regenerated in situ by injecting a gaseous regeneration agent into the aqueous solution that is in contact with said surface.

8. Process according to claim 7, in which the regeneration agent is a mixture of air and ozone, nitrogen and ozone or oxygen and ozone.

9. Process according to claim 7, in which the regeneration agent is injected using an air-lift or bubbling ramps.

10. Process according to claim 7, in which the gases such as excess ozone and $RuO_4$ that emanate from the aqueous solution during the dissolution process, are recovered and subjected to a scrubbing treatment using a scrubbing solution for these gases.

11. Process according to claim 10, in which the gas scrubbing solution is an aqueous solution comprising between 0.01 and 10 mol.l$^{-1}$ of OH ions.

12. Process for decontaminating circuits in nuclear fuel reprocessing plants, in which said process comprises the implementation of a process according to claim 1.

13. Process according to claim 2, in which said aqueous solution has a concentration of OH ions of between 0.01 and 6 mol.l$^{-1}$.

14. Process according to claim 2, in which said aqueous solution has a concentration of OH ions of between 0.03 and 0.6 mol.l$^{-1}$.

15. Process according to claim 2, in which contact is made at a temperature of between 5 and 50° C.

16. Process for decontaninating circuits in nuclear fuel reprocessing plants, in which process comprises the implementation of a process according to claim 11.

* * * * *